Aug. 21, 1934.  F. S. KUNEY  1,970,702
FLEXIBLE SHAFTING AND METHOD OF MAKING SAME
Filed Feb. 14, 1931
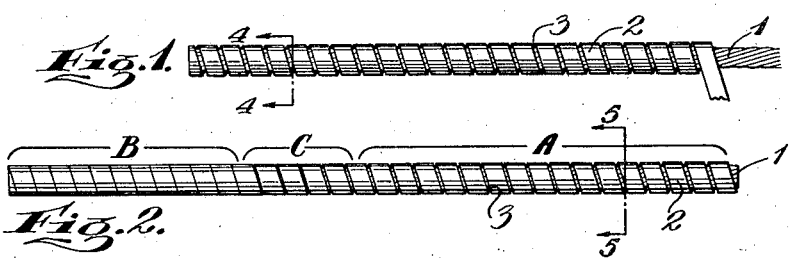
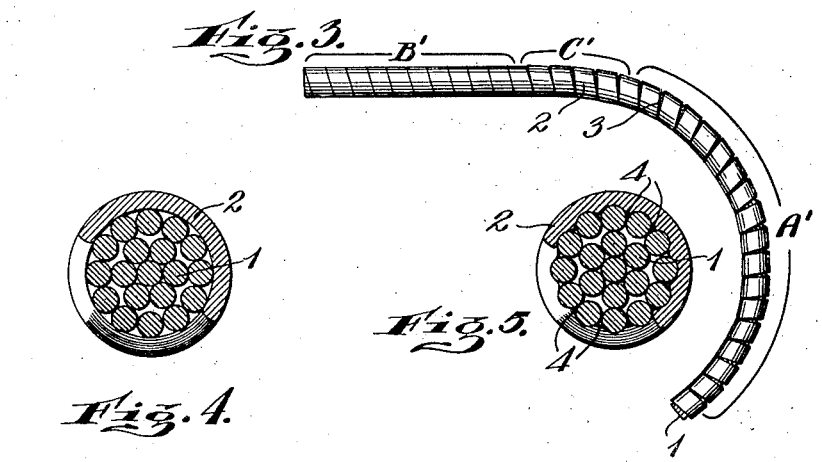
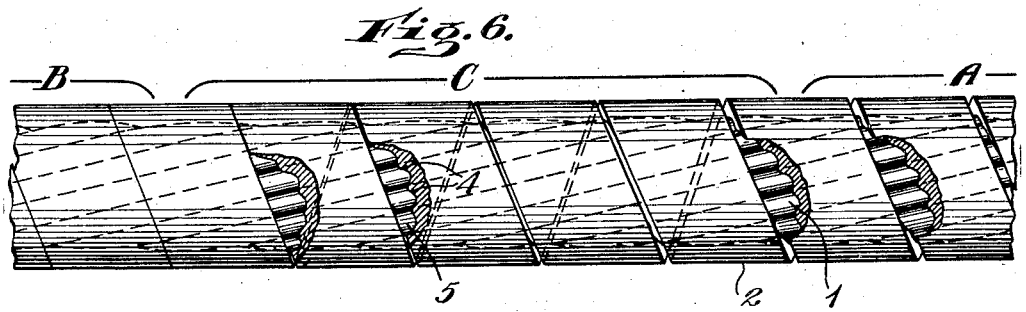
INVENTOR.
FRED S. KUNEY
BY Frederick S. Duncan,
ATTORNEYS.

Patented Aug. 21, 1934

1,970,702

UNITED STATES PATENT OFFICE 1,970,702

FLEXIBLE SHAFTING AND METHOD OF MAKING SAME

Fred S. Kuney, Adrian, Mich., assignor to American Cable Company, Inc., a corporation of Delaware Application February 14, 1931, Serial No. 515,685

12 Claims. (Cl. 29—148)

The invention relates to shafting, and the object broadly stated is to produce an improved article of this character that possesses sufficient capacity for flexure both as to range of and ease with which it may take place, and at the same time sufficient resistivity to "buckling" to make it especially useful as a reciprocating member for conveying power in conjunction with a supporting casing after the "push and pull" manner of the so-called "Bowden wire". Another object is to produce flexible shafting that will possess a high degree of resistivity to forces which tend to twist it on its axis. Another object is to produce flexible shafting in which all of the foregoing advantages are combined.

Another object is to secure the foregoing advantages or some of them by using ordinary cable as the basis of the flexible shaft structure in combination with enveloping reinforcing means.

Another object is to provide ordinary cable with a reinforcing casing or envelope that will present a smooth, nearly continuous surface, render the cable comparatively resistant to twist under the influence of torsional forces and easily flexed on a comparatively short radius, at the same time providing sufficient capacity for resistance to "buckling" to make it suitable for the usual uses to which flexible shafting is put.

Another object is to produce an integral length of shafting, successive sections of which shall possess varying capacities for flexure, ranging from the flexibility characteristic of ordinary cable to a rigidity comparable to that of solid rod.

Another object is to provide cable with a reinforcing envelope or casing which is always under tension of a kind that causes it to constrict itself about the cable.

Another object is to produce a reinforced cable suitable for use as flexible shafting, characterized by the fact that the material of the reinforcement is impacted or "flowed" into the interstices between the wires of the cable.

Another object is to produce cable enclosed in a reinforcing envelope which is tightly constricted about it and impacted into the interstices between the wires and which, at the same time, permits free flexing of the cable or restricts flexing altogether, or results in any state between as may be desired.

Another object is to surround cable with a reinforcing envelope of helical form and so applied that adjacent convolutions of the reinforcement or sheathing are prevented from rotating with respect to each other by virtue of being locked against rotation by the wires of the cable.

Another object is to apply to the cable reinforcement or sheathing of high resilient material in such a manner that the reinforcement or sheathing is in a state of constrictive tension which causes it to tightly hug the cable.

Referring to the drawing,

Fig. 1 is a view of a length of cable wrapped with flat metallic strip preparatory to the step in the process which results in constricting it about the cable and impacting or "flowing" it along the wires and into the interstices between them;

Fig. 2 is a view of a length of the flexible shafting in a complete state;

Fig. 3 is a view showing the shafting of Fig. 2 in a state of flexure;

Fig. 4 is an enlarged sectional view on the line 4—4 of Fig. 1;

Fig. 5 is an enlarged sectional view on the line 5—5 of Fig. 2;

Fig. 6 is an enlarged view of the complete shafting with part of the enveloping strip broken away to show how the material has been caused to flow or be impacted into the interstices between the wires of the cable.

The following is a description of a preferred form of the structure and of a preferred process of producing it:

A length of cable 1 of the dimensions adapted to suit the particular purpose in hand, and of relatively small angle of lay as shown in the drawing (Figs. 1 and 4) is first wrapped helically with wire 2, which is preferably of the cross-section known as "flat", the pitch of wrapping being such that the helical space 3 is left between the convolutions. Since the range of flexure of the completed shafting depends upon the ultimate width of this helical space 3 and the ease of flexure depends upon the constrictive force which the wrapping exerts on the core and, since both of these factors depend upon the treatment to which the wrapping is to be subjected as hereinafter more fully explained, due allowance must be made in determining the width of this space. In other words, the space must be sufficiently wide so that, when the wrapping wire is subjected to the swaging action which is hereinafter referred to, its ultimate width will be sufficient to permit flexure through the desired range, and at the same time the flexibility must be great enough to permit the completed article to be used as a flexible shafting. The material of the wire may be soft or highly resilient or in any state of elasticity between these two conditions accordingly as the particular purpose in hand may be best served. The next step comprises subjecting the wrapped cable of Fig. 1 to the action of forces which will produce the desired constriction of the wrapping wire. The extent of this constriction may be from that which merely causes it to be set to the shape which it occupies on the cable, with perhaps a slight tension on the cable, to that in which the material of the wrapping wire is flowed or impacted into the interstices between the wires of the cable. Coincident with the "flowing" or impacting of the material of the wrapping wire into the interstices between the wires is the "flowing" of this material along the cable, and it may be carried out to any extent desired from that which will only slightly close the helical space 3, as shown in that portion of Fig. 2 indicated by A, to that portion indicated by B. It may also be graduated to produce a gradually varying spacing of the convolutions as shown by that portion of Fig. 2 indicated by C. A suitable machine for performing the step just described is the ordinary rotary swaging machine, although a hammer swaging machine with semi-circular dies may be used instead with practically as good results. The portion A may be flexed to a curvature limited by contact on the inside of the curve of adjacent convolutions as indicated by the portion A', Fig. 3. The same is true of the portion C which may be flexed to a varying curvature as indicated by C', Fig. 3. The portion B is virtually a rigid rod, since the convolutions are initially in contact. The particular length of shafting shown in Fig. 2 is, therefore, made up of the rigid portion B, the uniformly flexible portion A, and the portion C which may be flexed on a gradually varying radius. The particular value of the graduated portion C lies in the fact that it prevents sharp bends which would be undesirable when the article is used for power transmission in a flexible casing. The rigid portion B may serve many useful purposes; for example, as a means for attachment of a handle, chuck or other suitable device for manipulating the flexible portion of the shaft in a tube. This rigid portion may be threaded or squared or made of any suitable cross-sectional shape for accommodating attachments and convenient manipulating devices.

In Fig. 6 portions of the casing are broken away showing how the material of the casing is flowed into the interstices between the exterior wires of the cable. Obviously adjacent convolutions are thereby locked against rotation with respect to each other, an effect which serves to resist forces tending to twist the structure. A flexible shafting constructed according to Fig. 6 therefore combines the advantages of rigidity in one portion, flexibility in another portion, and a high degree of resistance to torsional forces.

In using the word "cable" in the foregoing description, it is to be understood that I intend to include any multi-wire stranded structure such as rope, strand, and the like.

Having thus described the illustrated embodiments of my invention and having in mind that variations and modifications of the same may be made, I define the scope of the invention by the following claims.

I claim:

1. Flexible shafting comprising a multi-wire core surrounded by a casing of strip material helically wound on said core in spaced convolutions of relatively short pitch, the material of said casing adjacent the core being in a state of impactment in the interstices between the wires of the core.

2. Flexible shafting comprising a core of cable wrapped in a casing of flat wire helically wound about it in spaced convolutions, the material of the casing adjacent the core being in a state of impactment in the interstices between the wires of the cable.

3. A length of flexible shafting comprising a core of cable wrapped in a flat wire casing wound in helical convolutions and in a state of impactment in the interstices between the wires of the cable, the degree of impactment varying at different sections of the shafting.

4. Flexible shafting comprising a core of cable wrapped in a casing of flat wire helically wound about it in spaced convolutions, the wires of the cable and the material of the casing being interlocked with each other.

5. Flexible shafting comprising a core of cable wrapped in a casing of flat wire helically wound about it in spaced convolutions, adjacent convolutions being locked against rotation with respect to each other by impactment of the material of the said flat wire into the interstices between the wires of the cable.

6. A length of shafting comprising a core of cable wrapped in a flat wire casing wound in helical convolutions and in a state of impactment in the interstices between the wires of the cable, the convolutions of the casing at one section of the said length of shafting being contiguous with each other and the convolutions of another section being spaced from each other.

7. An integral length of flexible shafting comprising a rigid section, a second section of graduated flexibility, and a third section of uniform flexibility.

8. The process of applying a wrapping to a multi-wire core which comprises winding the wrapping about the core in spaced helical convolutions and impacting the material of the wrapping into the interstices between the wires of the said core.

9. The process of producing flexible shafting which consists in wrapping metallic strip material in spaced helical convolutions about a multi-wire core and then applying peripheral forces to the material to cause it to be impacted into the interstices between the wires of the core and to cause the said material to flow longitudinally along the core.

10. The process of producing flexible shafting which consists in winding metallic strip material in spaced helical convolutions about a multi-wire core and then applying peripheral forces to the material to cause it to be impacted into the interstices between the wires of the core and to cause the said material to flow longitudinally along the core, the impacting operation being carried out to such an extent that the said strip material exerts a constrictive tension on the said core.

11. The process of producing flexible shafting which comprises wrapping a strip of material in spaced helical convolutions about a length of cable and applying impacting forces to the periphery of the structure thus produced until the material of the strip is impacted into the interstices between the wires of the cable and is expanded longitudinally of the cable.

12. The process of producing an integral length of shafting part of which is rigid and part of which is flexible, which comprises applying to a length of cable an envelope of helically wound metallic material, applying peripheral forces to said envelope to cause the convolutions, at the part to be made rigid, to flow longitudinally until they are contiguous with each other and to cause the convolutions covering the portion to be made flexible to be impacted into the interstices between the wires of the cable.

FRED S. KUNEY.